United States Patent [19]

Anderson et al.

[11] 4,389,577
[45] Jun. 21, 1983

[54] APPARATUS FOR POWER LOAD-SHEDDING WITH AUXILIARY COMMANDABLE THERMOSTAT

[75] Inventors: Paul A. Anderson, New Brighton; Jeffrey M. Hammer, St. Louis Park; J. Ward MacArthur, Minneapolis, all of Minn.

[73] Assignee: Honeywell Inc., Minneapolis, Minn.

[21] Appl. No.: 368,487

[22] Filed: Apr. 14, 1982

[51] Int. Cl.³ .............................................. H02J 13/00
[52] U.S. Cl. ....................................... 307/39; 364/493
[58] Field of Search .................................... 307/38-40; 340/310 R, 310 A; 364/492, 493

[56] References Cited

U.S. PATENT DOCUMENTS 4,228,511 10/1980 Simcoe et al. ..................... 307/39 X
4,288,990 9/1981 Schulz ................................ 307/39 X
4,333,002 6/1982 Kozak ................................. 307/40 X Primary Examiner—Donald A. Griffin
Attorney, Agent, or Firm—Charles G. Mersereau

[57] ABSTRACT

An apparatus for power load-shedding is disclosed which has an auxiliary thermostat disposed in the conditioned space for controlling the CN-OFF cycling function of a space conditioning apparatus during a load-shedding interval. The auxiliary thermostat includes an external communication signal receiver and a transmitter for transmitting control signals to a space conditioner control which controls the connection of available power to the space conditioner. The thermostat utilized during normal operation of the space conditioning means is disconnected during the load-shedding interval. The auxiliary thermostat is adapted to be supplied with line voltage as by plugging into a conventional outlet.

10 Claims, 4 Drawing Figures

APPARATUS FOR POWER LOAD-SHEDDING WITH AUXILIARY COMMANDABLE THERMOSTAT

BACKGROUND OF THE INVENTION

1. Field of the Invention

The present invention relates generally to controlling the peak power demand in an electrical power distribution network by controlling the power consumption of individual loads such as air conditioning loads and, more particularly, to a system for remotely overriding the thermostats of individual space conditioning apparatus to control the temperature in the space in a predetermined manner based on external commands but without the necessity of changing or modifying the existing thermostat.

2. Description of the Prior Art

One of the most serious problems confronting electrical utility companies today is the great variance in total electrical demand on a network between peak and off-peak times during the day. Peak demand periods are intervals of very high demand on the power generating equipment where load shedding may be necessary to maintain proper service to the network. These occur, for example, during hot summer days occasioned by the wide spread simultaneous usage of electrical air conditioning devices or during the coldest winter months in areas where the usage of electrical heating equipment is prevalent.

Electric utility companies have turned to load shedding as a means of controlling peak demand and this has led to the use of the term "load-shedding interval". It is desirable that a load-shedding device reduce power demand uniformly over the entire load-shedding interval because the actual peak of power demand on the total utility grid could occur at any time during the load-shedding interval.

In the prior art it is known to send signals either over the power lines or by utilizing a radio-type signal emanating from the utility to disconnect or interrupt the use of certain selected electric loads such as airconditioning compressors when the demand has reached a certain limit.

One such system is illustrated and described in U.S. Pat. No. 4,228,511 to Simcoe et al dated Oct. 14, 1980. That application illustrates and describes the method of controlling the electrical power demand which includes assuming control of the setpoint function of the space-conditioning thermostat associated with the load at the beginning of a load-shedding interval. This may be in response to a radio signal. The overriding control functions to cause the setpoint to change at a constant fixed rate in a direction toward less power consumption to achieve load shedding over the load-shedding interval. In this manner the temperature is ramped at a preset fixed ramping rate.

Such systems provide satisfactory methods for the control of power consumption during load-shedding intervals. However, all such systems require either the replacement of the existing thermostat in the conditioned space with one specifically designed to accommodate the overriding control of the installation of a control module auxiliary to the existing thermostat in the conditioned space. These replacements or modifications may also require expensive additional wiring in existing installations. Thus, there exists a definite need for a low cost, simple system which can accomplish much of the function of the more elaborate systems without the need for expensive modification or replacement of existing temperature control equipment.

SUMMARY OF THE INVENTION

By means of the present invention, there is provided an auxiliary temperature sensor in the conditioned space which transmits the sensed temperature and control data via powerline carrier, or the like, to provide the control temperature during a load-shedding interval. The system includes a radio frequency or other receiver to receive external command signals as from the electric power supplier ambient temperature sensor, control device for utilizing command sensed information and initiating transmission of data, such as a microprocessor, and a powerline carrier or similar transmitting device. The unit is selfcontained and may simply be plugged into a wall outlet. Also, it does not require a separate adjustable setpoint function as with conventional thermostats.

In response to a message received from the utility or power company indicating the inception of a load-shedding interval, the setpoint function of the thermostat associated with the load is then overridden by the auxiliary thermostat which is then utilized to control the compressor or other load function in the manner prescribed for the load shedding interval. Thus, in the cooling mode, the temperature setpoint may be raised, for example, in a ramping fashion with the operation of the air conditioning compressor controlled from the auxiliary thermostat in communication with the control system via powerline carrier, or the like.

BRIEF DESCRIPTION OF THE DRAWINGS

In the drawings wherein the like numerals are utilized to designate like parts throughout the same.

DESCRIPTION OF THE PREFERRED EMBODIMENT

Figure 1:
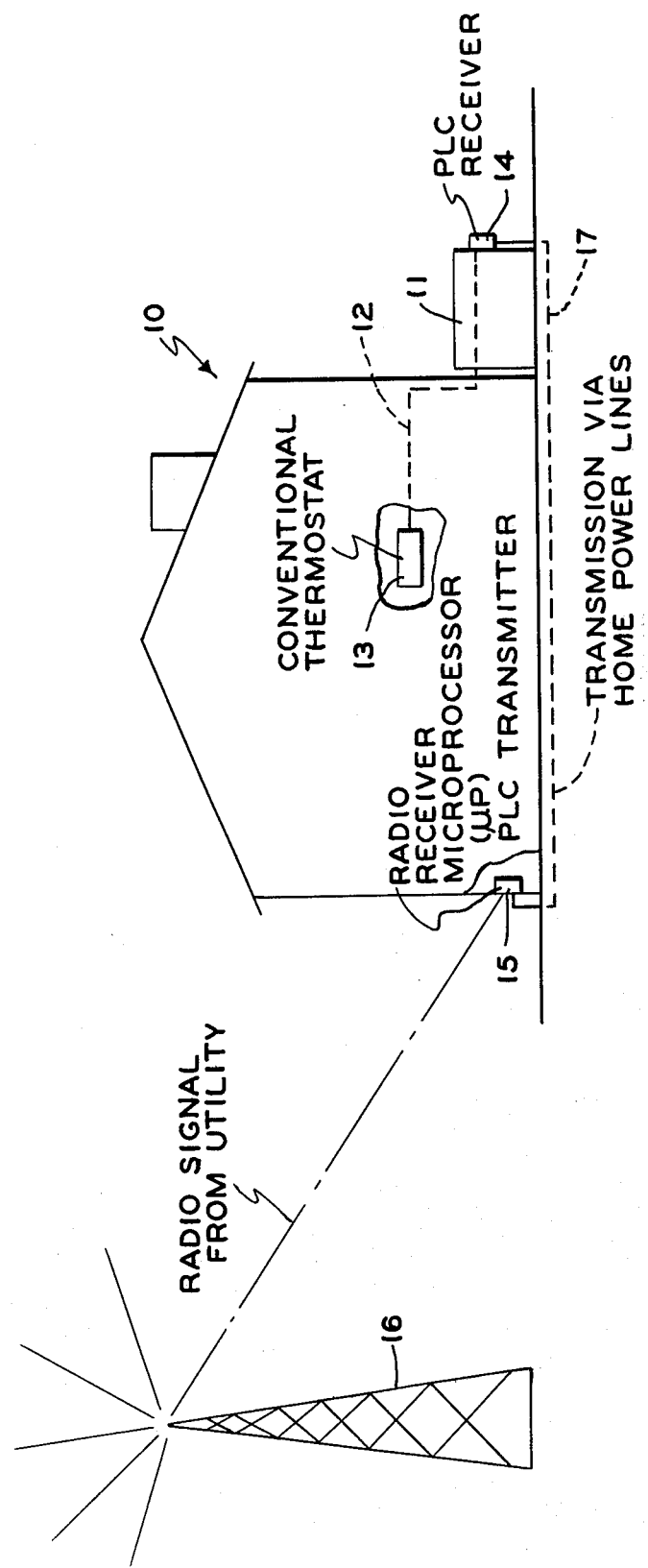
FIG. 1 is a representation of a typical installation using the auxiliary thermostat control of the present invention.

FIG. 1 illustrates a conventional dwelling at 10 having an air conditioning compressor 11 connected by a low voltage control wire shown by the dashed line at 12 to a conventional thermostat 13. In addition, a powerline carrier with an auxiliary temperature sensing and control system 15 is also in communication with the utility via radio transmission from transmitter 16. The system 15 communicates with the receiver 14 via home powerlines shown dashed at 17.

Figure 2:
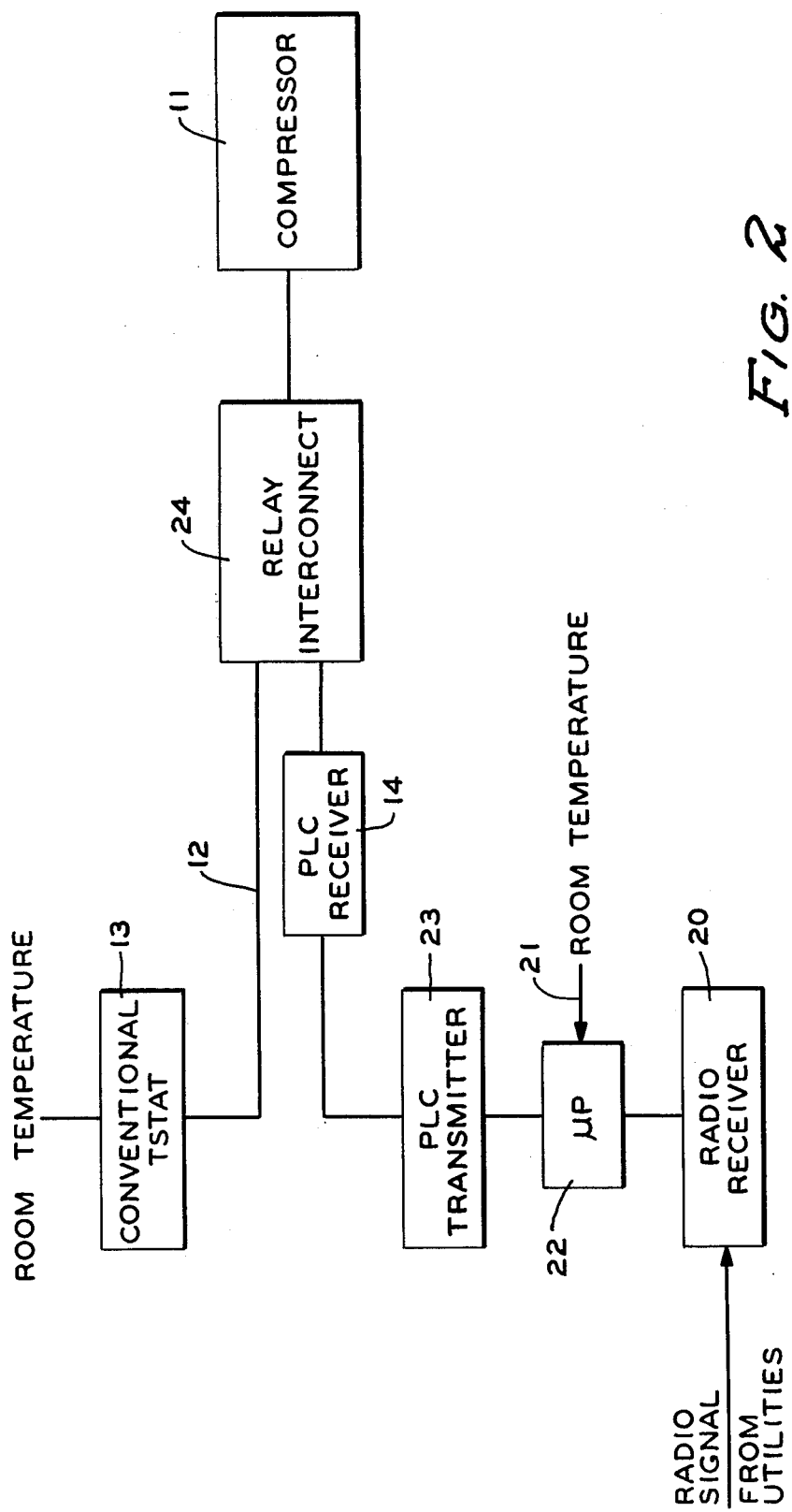
FIG. 2 is a block diagram of the system of FIG. 1.

The basic functions of the system of the invention are shown in somewhat more detail in the block diagram of FIG. 2. As can be seen from that diagram, the system 15 further includes a radio receiver 20 for receiving external control commands from the utility company via radio frequency communication, a room temperature sensor which provides an input 21, and a microprocessor or other system data utilization and control means 22. A powerline carrier transmitter shown at 23 is provided which communicates over the powerline with the powerline carrier receiver 14. As shown in the diagram the operation of the compressor 11 may be controlled in either of two modes through a relay interconnect 24.

Figure 3:
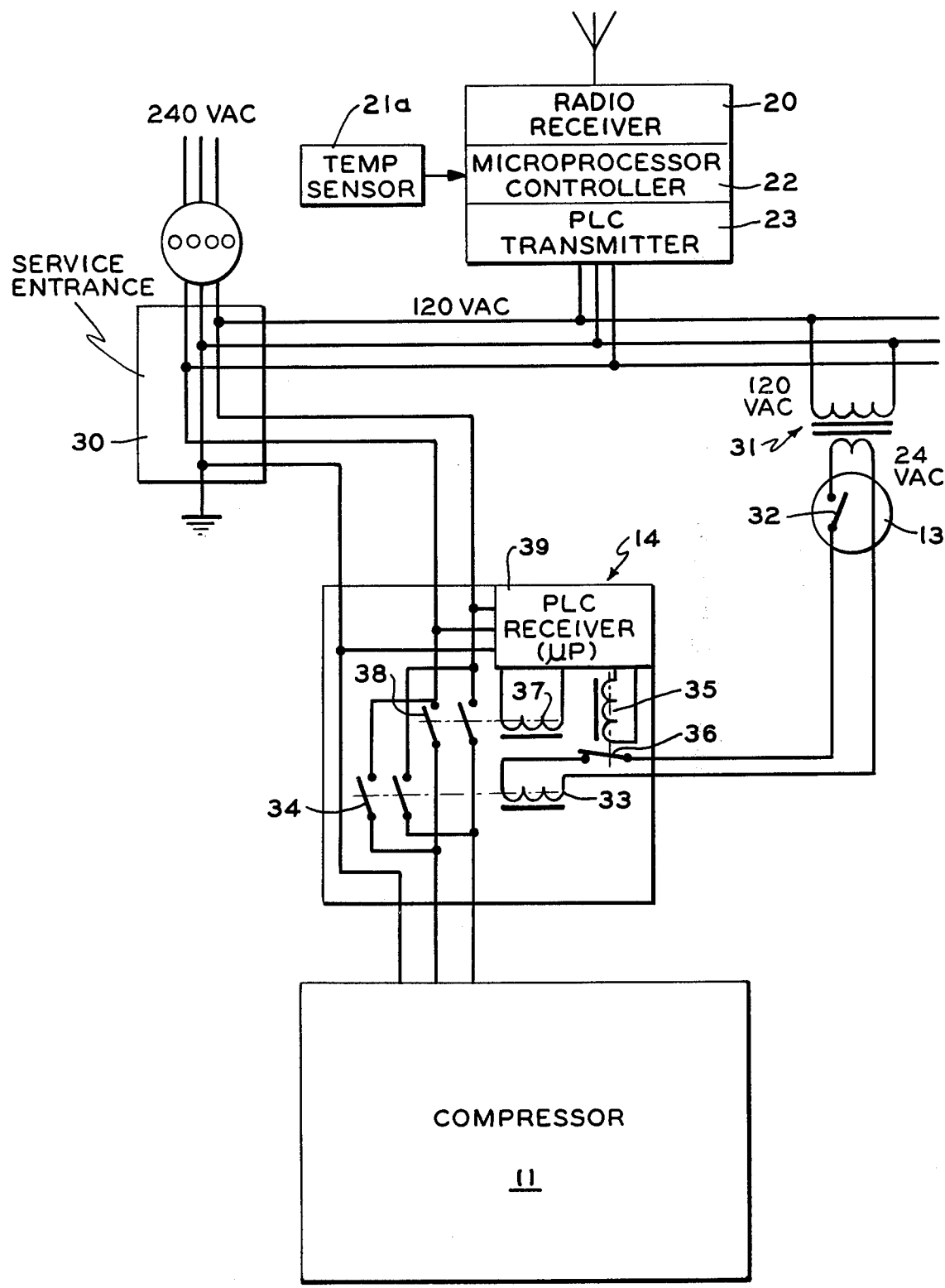
FIG. 3 is an electrical schematic drawing of the system showing the overriding control function in accordance with the invention.

FIG. 3 shows the control circuitry in greater detail. A conventional 240 volt service input is shown at 30 which supplies power for the compressor powerline carrier communication systems, low voltage thermostat control system, etc. A transformer 31 provides low voltage 24 volt control power to the thermostat 13 and, when the thermostat switch 32 closes in response to the temperature of the conditioned space rising above the control setpoint, this causes a relay coil 33 to become energized thereby closing associated normally open contacts 34 and allowing the compressor 11 to run as long as the thermostat switch 32 remains closed. When the sensed temperature of the conditioned space drops to the setpoint, switch 32 opens and the compressor is shut off in a well-known manner. The system cycles in this way during the normal mode of operation.

The PLC receiver/control unit also contains an additional coil 35 with associated normally closed contact 36 and a coil 37 with associated normally open contacts 38 which are utilized in the overriding control system associated with the present invention. When an external command signal is received via the radio receiver 20 from the utility or power company which indicates the beginning of a load-shed interval, control is switched to the auxiliary overriding mode from the normal control mode. In this mode the temperature is sensed by the auxiliary temperature sensor 21a and is used by the microprocessor controller 22 which transmits information based on the sensed temperature, external commands, and load-shed program via the powerlines to the PLC receiver unit 39 in the PLC receiver/controller 14. When the system is under the control of the auxiliary commandable thermostat of the invention rather than the thermostat 13, the coil 35 is activated by the microprocessor unit associated with receiver 39 such that it opens contact 36 overriding the normal thermostatic control during the power load-shedding interval. In addition, as controlled by temperature sensor 21 along with microprocessor 22, the coil 37 with associated contacts 38 is utilized to turn the compressor 11 on and off according to the control desired during load-shedding interval.

Figure 4:
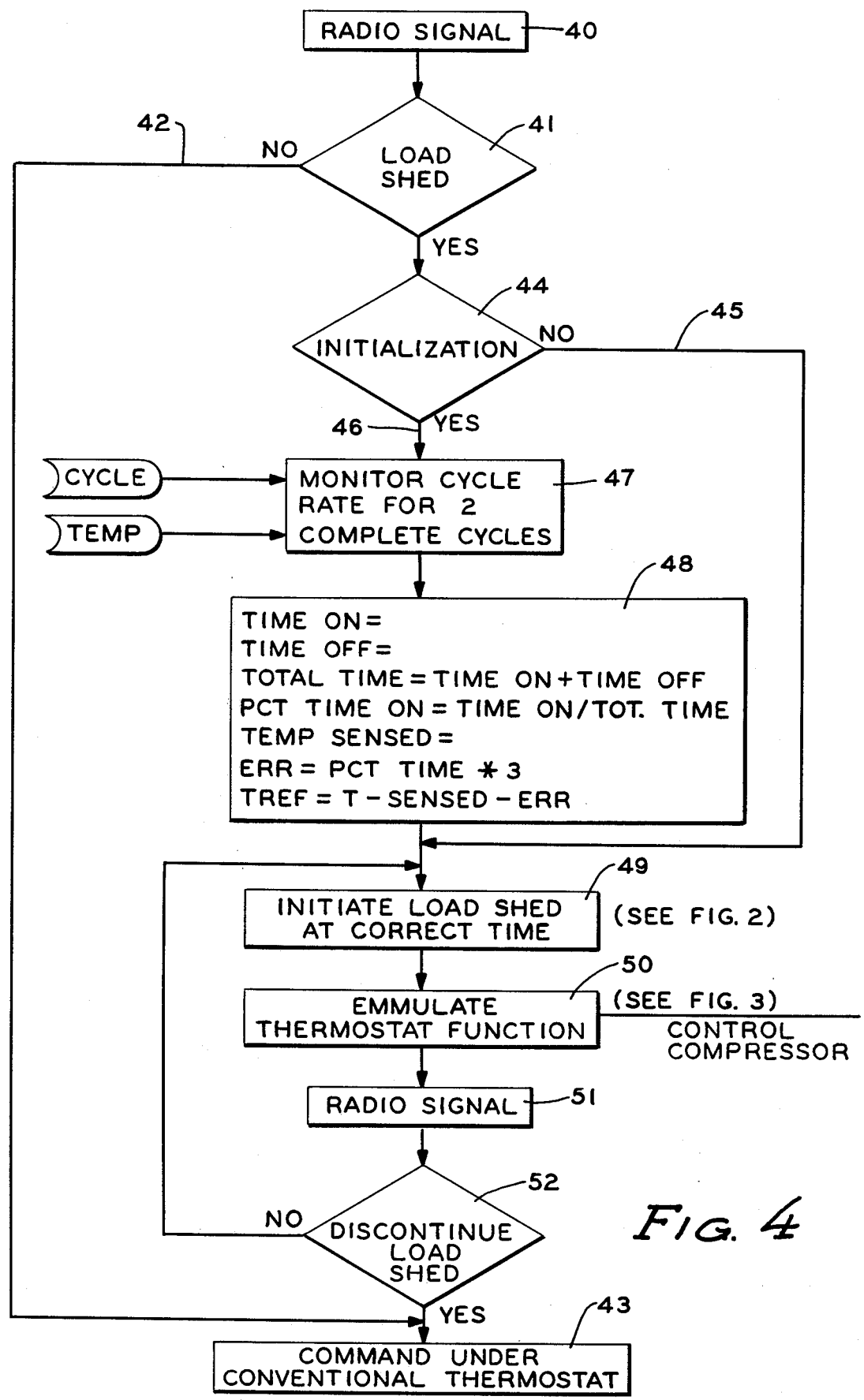
FIG. 4 is a flow chart of a possible routine associated with the present invention.

FIG. 4 illustrates a flow chart associated with the power load-shedding control in accordance with the present invention. The external command radio signal is received at 40 and may be a command which tells the system to commence, continue or discontinue load shed at 41. If the signal calls for no load shed then the signal exits via 42 to return the system to the control of the conventional thermostat at 43. If, however, the signal indicates that load shed should proceed it exits to block 44, which determines whether initialization should occur immediately or at some delayed time. If initialization is to be delayed, it exits via 45. If initialization is to occur immediately via 46 to 47 wherein the cycle time may be monitored, for example, for two complete cycles and the information then stored at 48 if, for example, the cycle times are to be used for load-shed control or future reference. The particular mode of operation illustrated at 48 includes deriving the total cycle time and the percent ON time. The ERR measurement of percent time ON times 3° F. is a measurement which is designed to account for the typical thermostat "droop" or natural offset which occurs with such devices and is well known to those skilled in the art. In the last data line in 48 the reference temperature to be used for load-shedding is corrected for the droop factor.

When load shed is initiated as at 49 control is through the auxiliary temperature sensing control and transmitting unit as previously described in regard to FIGS. 2 and 3. The thermostat function is emulated at 50 in the desired manner. as previously described in regard to FIGS. 2 and 3. The thermostat function is emulated at 50 in the desired manner. This control continues until the receipt of another radio signal at 51 which as shown at 52 may cause the load-shed interval to continue or be discontinued at which time the command is returned to the conventional thermostat. Normally, such signals may be received periodically during the load-shed interval.

The load-shed function associated with the control by the auxiliary thermostat system may be substantially similar to that illustrated and described in greater detail in co-pending application, Ser. No. 122,787 filed Feb. 19, 1980, and now U.S. Pat. No. 4,341,345, issued July 27, 1982 which is assigned to the same assignee as the present invention. In this manner the conditioned space temperature sensing and compressor cycle control function associated with the control thermostat 13 in the normal mode is replaced by that of the auxiliary thermostat, in the load-shed mode.

The auxiliary thermostat is preferably a self-contained module that plugs into a conventional outlet in the conditioned space as shown in FIG. 1. The low voltage AC, if required for control, along with any DC power required to operate electronic components may be derived from the line voltage in a well-known manner. There is no need to install any additional wiring. Also eliminated is the need for any modification of the conventional control thermostat or the necessity for replacing that thermostat with an entire new unit having the desired load-shedding interval control function. The auxiliary thermostat does not require a separate adjustable setpoint as this function is derived from the sensed temperature.

While the present invention has been described with regard specifically to the compressor of an air conditioning or cooling means, it can readily be seen that such can also be utilized with regard to any electric heating means, heat pump control or the like.

The embodiments of the invention in which an exclusive property or right is claimed are defined as follows:

1. An apparatus for controlling the operation of a thermostatically controlled space-conditioning means comprising:
   auxiliary thermostat means disposed in a conditioned space for controlling the ON-OFF cycling function of a space conditioning means during a load-shedding interval;
   space conditioning control means in communication with said auxiliary thermostat means for connecting and disconnecting power to said space conditioning means in response to communications from said auxiliary thermostat means;
   disconnect means connected to said space conditioning control means for disconnecting the thermostat utilized during normal operation of the space conditioning means for the interval of control by said auxiliary thermostat means; and
   communication means including transmitter means associated with said auxiliary thermostat means for sending control signals to said space conditioning control means and receiving means associated with said space conditioning control means for receiving said control signals.

2. The apparatus according to claim 1 further comprising external communication receiving means associated with said auxiliary thermostat means for receiving external control commands directed to the load-shedding function.

3. The apparatus according to claim 2 wherein said external command receiving means is a radio frequency receiver.

4. The apparatus according to claim 2 wherein said auxiliary thermostat means further comprises:
an auxiliary thermostat; and
data processing means associated with said auxiliary thermostat for controlling said auxiliary thermostat and said associated transmitting means in response to the temperature sensed in said conditioned space by said auxiliary thermostat and said external command signals received by said external communication receiving means.

5. The apparatus according to claim 4 wherein said auxiliary thermostat means is adapted to operate with input power from line voltage.

6. The apparatus according to claim 1 wherein said auxiliary thermostat means further comprises:
an auxiliary thermostat; and
data processing means associated with said auxiliary thermostat for controlling and said auxiliary thermostat and said associated transmitting means in response to the temperature sensed in said conditioned space by said auxiliary thermostat.

7. The apparatus according to claim 1 wherein communications between said auxiliary thermostat means in said space conditioning control means are by powerline carrier.

8. The apparatus according to any of claims 1, 2, 3, 6, or 7 wherein said auxiliary thermostat means is adapted to operate with input power from line voltage.

9. The apparatus according to either of claims 1 or 7 further comprising data processing means associated with said space conditioning control means for controlling said space conditioning control means and said means for disconnecting the conventional thermostat in response to signals communicated from said auxiliary thermostat means.

10. An apparatus for controlling the operation of a thermostatically controlled space conditioning means comprising:
auxiliary thermostat means, adapted to operate with input powr from a line voltage input, disposed in the conditioned space for controlling the ON-OFF cycling function of a space conditioning means during a load-shedding interval, said auxiliary thermostat means further comprising;
an auxiliary thermostat, communication receiving means for receiving external control commands directed to the load-shedding function,
data processing means for controlling said auxiliary thermostat in response to temperature sensed in said conditioned space by said auxiliary thermostat and said external control commands; and
transmitter means for sending control signals to a space conditioner control means;
space conditioner control means connected to said space conditioning means, said space conditioner means further comprising;
communication receiving means for receiving control signals from said auxiliary thermostat means,
data processing means for utilizing said received control signals for controlling the operation of said space conditioning means,
means for connecting and disconnecting power to said space conditioning means in response to said control signals; and
means for disconnecting the thermostat utilized during normal operation of said space conditioning means for the interval of control by said auxiliary thermostat in response to control signals from the said auxiliary thermostat.

* * * * *